April 28, 1953     A. SCHNEIDER     2,636,194
METHOD OF MAKING SELF-LOCKING SCREWS
Filed July 23, 1949
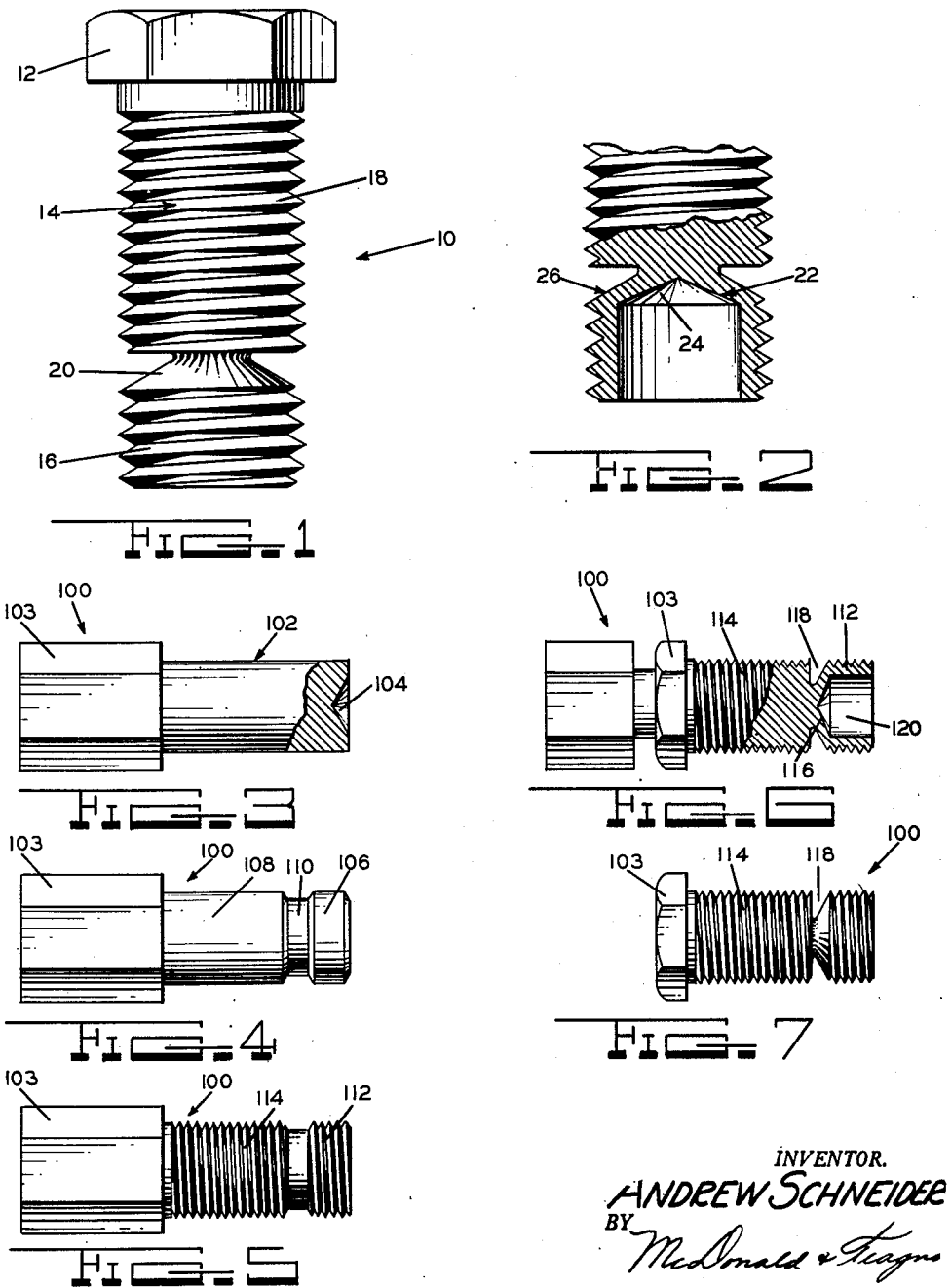
INVENTOR.
ANDREW SCHNEIDER
BY
McDonald & Feagns
ATTORNEYS Patented Apr. 28, 1953

2,636,194

UNITED STATES PATENT OFFICE 2,636,194

METHOD OF MAKING SELF-LOCKING SCREWS

Andrew Schneider, Saginaw, Mich., assignor to Eaton Manufacturing Company, Cleveland, Ohio, a corporation of Ohio Application July 23, 1949, Serial No. 106,407

2 Claims. (Cl. 10—10)

This invention relates to self-locking screws and particularly to the method of manufacture thereof.

Broadly the invention comprehends the method of making a self-locking screw of the type having a pair of threaded mismatched lead sections interconnected by a resilient diaphragm extending substantially radially therebetween wherein the threaded sections are required to be formed in mismatched relation prior to the formation of the diaphragm section.

Heretofore in the manufacture of integral self-locking screws of the type having a solid externally threaded shank portion and a hollow externally threaded thin walled shank portion connected by a hollow unthreaded shank portion having an outside diameter less than the inside diameter of said hollow shank portion, wherein the screw threads on the threaded portions being of equal pitch diameter but with their helixes axially offset with relation to one another, it has been necessary to use progressively feeding thread rollers in the rolling of the threads thereon so as to prevent collapse of the thin walled shank portion in the performance of the thread rolling operation subsequent to the manufacture of the screw blank with its thin walled sections. This method of providing for rolling of the threads has proven to be time consuming and, therefore, not a practically economical means while at the same time requiring extreme care in said rolling operation so as not to injure the thread or thin walled sections of the blank. The invention to be hereinafter described provides the method of rolling the threads in lead mismatched relation upon a prepared screw blank prior to internal boring and formation of the connecting resilient thin walled section, thus permitting of the quick and economical rolling of the threads by reciprocating roller die means effective to impress a full depth threaded section on the screw blank in a single pass threading operation.

An object of the invention is the method of simply and economically manufacturing self-locking screws comprising a pair of threaded sections of like pitch diameter wherein the lead of one section is axially offset a predetermined distance to the other section, and having a resilient unthreaded diaphragm section interconnecting the threaded sections.

Another object of the invention is the method of manufacturing a self-locking screw comprising the steps of first machining a blank with appropriate sections, next rolling threads in mismatched lead relation upon a pair of axially spaced sections and then machining a resilient diaphragm section intermediate the threaded sections in integral interconnecting relation thereto.

A further object of the invention is the provision of a method of manufacturing a self-locking screw having a pair of like diameter threaded sections, wherein the lead of one section is axially offset to the other section, separated by a reduced diameter resilient wall section of specific conical configuration comprising the requirement to roll the threads in mismatched relation on an appropriate solid blank prior to the machining of the resilient wall section so as to positively insure the proper accurate, and effective machine rolling of the threaded sections.

A yet further object of the invention is the method of manufacturing a self-locking screw comprising machining a solid cylindrical blank having a pair of like diameter sections spaced apart by an interconnected reduced diameter section, rolling threads of like pitch diameter but in axially offset relation on the like sections, and then machining the reduced section to truncated conical shape simultaneously with boring a hole in one of the threaded sections to provide a conical substantially thin walled diaphragm at the reduced section and wherein one of the threaded sections has a resulting thin wall.

Other and further important objects and advantages of this invention will be apparent from the following description taken in connection with the drawings forming a part of the specification and in which:

Fig. 1 is a side elevational view of a self-locking screw.

Fig. 2 is a fragmentary enlarged sectional view of the diaphragm section of the screw as related to the mismatched threaded sections thereof; and Figs. 3 through 7 show the self-locking screw of Fig. 1 through the step by step stages of manufacture thereof.

This application is a continuation in part of my application Serial No. 47,685 for Self-Locking Screw filed September 3, 1948, which has matured into U. S. Patent No. 2,555,662, granted June 5, 1951 and pertains specifically to a practical method of easily, accurately and effectively manufacturing the screw disclosed by said application providing for a screw of desired strength, diaphragm section resiliency and sufficient torque holding quality for all purposes for which it is intended.

In the manufacture of the screw disclosed by my patent it has been determined best for economy and accuracy to roll the threads on the axially spaced sections thereof in mismatched relation to one another and to so accomplish same it is essential because of the necessity to provide a reasonably thin walled section through one threaded section for the proper formation of the tubular conical resilient diaphragm section between the threaded sections, to roll the threads on an appropriately machined blank prior to machining of the diaphragm section. The diaphragm section is made through the combined external taper cutting of the reduced unthreaded section and the drilling of a hole in one threaded section, said drill having a point of predetermined angularity to form the internal wall of the diaphragm having a predetermined relation to the taper on the outer wall thereof.

Referring to the drawings for more specific details of the invention 10 represents generally a self-locking screw of the type primarily used in conjunction with engine tappets, comprising a hexagonal head portion 12, and a shank 14 extending axially from the head in concentric relation thereto.

The shank 14 of the screw includes a pair of axially spaced threaded sections 16 and 18 integrally interconnected by a reduced diameter unthreaded diaphragm section 20, with the lead of the thread on section 18 axially offset to the lead of the thread on section 16. The pitch diameter of the threaded sections are desirably made equal.

The diaphragm section 20 is conical tubular in form, the internal wall 22 of which is formed by an axial bore extending from the free extremity of the screw, oppositely disposed from head 12, in concentric relation to the screw through the threaded section 18, terminating in a taper 24.

The outer wall 26 of diaphragm section 20 is machined to a taper providing for the prescribed cross-sectional shape of the section wherein the walls 22 and 26 converge toward one another at their outward radially directed limits and diverge from one another at their inner radial limits thereby providing ample resiliency and elasticity without chance of rupture through the section due to the axial deformation taking place therein when the screw is threaded for locking relation into an internally threaded member, not shown, of substantially equal pitch diameter and constant lead throughout its threaded length.

Fig. 3 through 7 illustrate the steps in fabricating the hereinbefore defined screw comprising the initial step of machining a hexagonal bar 100 to provide a cylindrical body portion 102 and hexagon head 103, said cylindrical body portion being center drilled at 104 to a slight depth at its end oppositely disposed from the head along the axis thereof.

The cylindrical body portion is next machined intermediate its length and reduced in diameter to provide a pair of spaced sections 106 and 108 of like diameter and an interconnecting reduced section 110.

With the cylindrical body portion machined to the condition of Fig. 4 it is next subjected to a thread rolling operation of the reciprocating roller type effective to provide threads 112 and 114 on the respective sections 106 and 108 in a quick and economical manner, said threads being of equal pitch diameter but with the lead of the threads on one section offset to the lead of the threads on the other section.

The reduced diameter unthreaded section 110 is next machined to provide a tubular conical diaphragm 116 wherein a forming tool is used to cut a tapered groove 118 between the threaded sections and a drill is centered in the previously drilled centering hole 104 shown by Fig. 1 having predetermined size and angular tip to bore a hole 120 into the threaded section 108—114 concentric thereto terminating in a taper. The angular taper of the forming tool used and angularity of the tip of the drill are preferably so related to one another as to form the conical tubular section with its inner and outer walls converging toward one another at the junction with the threaded sections 106—112.

With the completion of machining to form the diaphragm section, a cut off tool is used to remove the finished screw. The screw is then ready for heat treating and final preparation to accommodate it for use with engine tappets or the like when an adjustable self-locking screw of this type is required.

It is requisite in the formation of the screw shown at the completion of its machining operations by Fig. 7 to perform the operations therein in the sequence of order depicted by Fig. 3 through 7 especially because of the necessity to have a firm body upon which the threads are to be rolled, it being practically impossible to roll the threads upon section 108—114 with parallel thread rolling dies if the hole 120 was drilled prior to the thread rolling operation.

The wall of section 108—114 becomes a reasonably thin section after the drilling operation because of the necessity to afford as long a radial resilient diaphragm section as possible sufficient to permit of the elastic deformation thereof during use without rupture.

The screw as shown in completed form in Fig. 7 is for all purposes identical to the screw disclosed by Figs. 1 and 2 and differs with regard to numerical designation solely for the purpose of better defining the machining operations performed therein resulting in a finished screw.

Other and incidental conventional machine operations not defined or set forth may be required for the final finished conditioning of the screw but they are not believed necessary of recitation as they do not alter the basic manufacture as hereinbefore defined.

In view of the fact that the screw as defined is susceptible of a great number of uses dependent on the required torque holding application thereof no limitation is made as to whether the thread mismatching is negative or positive and in keeping with the method as defined the invention is limited only as indicated by the scope of the appended claims.

What I claim is:

1. The method of manufacturing a self-locking screw of the integral type comprising machining a screw blank with a shank having a pair of axially spaced like diameter solid portions connected by a reduced diameter solid portion, rolling external threads on the like diameter solid portions, said threads being of equal pitch diameter on both portions but having the lead on one portion offset to the lead on the other portion, and simultaneously machining the external surface of the reduced diameter portion of the shank to a taper and drilling a hole concentrically into a threaded section throughout the axial length thereof and into the reduced diameter portion internally of the taper to provide with the external taper machined surface a conical hollow wall section.

2. The method of manufacturing a self-locking screw comprising the forming of a screw blank with a shank having a pair of axially spaced equal diameter solid portions interconnected by a reduced diameter solid portion, rolling threads of equal pitch diameter on the equal diameter portions with the lead of the thread on one portion axially offset to the lead on the other portion, machining the reduced diameter portion with a forming tool to provide adjoining surfaces one extending perpendicular to the axis of the threaded portions and the other extending from the junction with the perpendicular surface at a prescribed angle, and drill a hole in one of the threaded portions concentrically therewith extending throughout its length and into the machined reduced diameter portion and terminating in a taper of prescribed angularity at its bottom radially inwardly disposed of the external angular surface to provide an annular conical section having an outwardly tapering cross section.

ANDREW SCHNEIDER.

References Cited in the file of this patent

UNITED STATES PATENTS

| Number | Name | Date |
| --- | --- | --- |
| 2,202,928 | Shaw | June 4, 1940 |
| 2,224,659 | Stoll | Dec. 10, 1940 |
| 2,427,560 | Johnson | Sept. 16, 1947 |